Patented Mar. 5, 1935

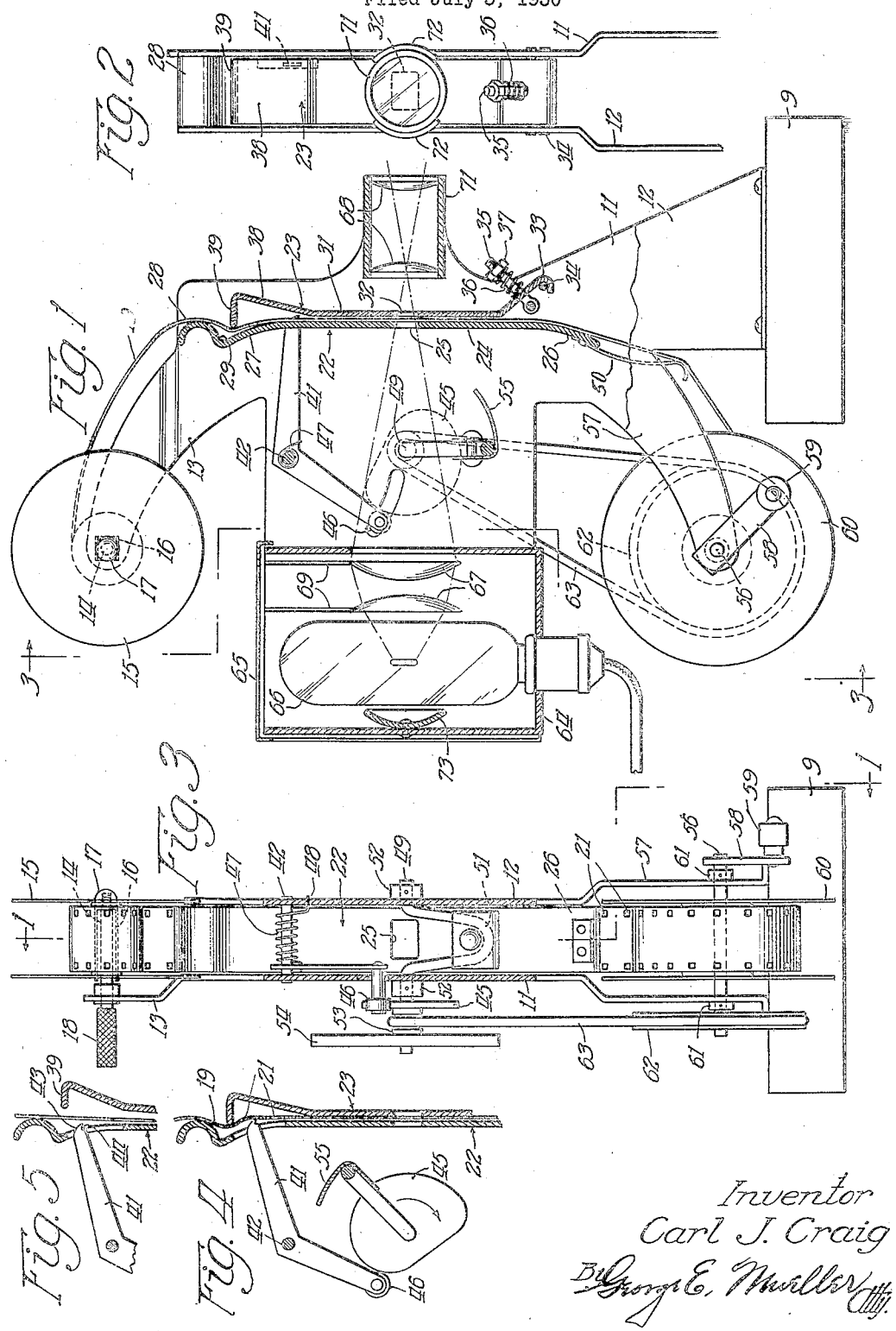

1,993,209

UNITED STATES PATENT OFFICE 1,993,209

MOVING PICTURE PROJECTOR

Carl Jacob Craig, Chicago, Ill.

Application July 3, 1930, Serial No. 465,502

10 Claims. (Cl. 88—18.4)

My invention relates to a moving picture projector and particularly to a portable projector.

There are many types of projectors on the market which are mechanically complicated and require expert care to maintain them in adjustment.

An object of my invention is to provide a new and improved moving picture projector.

A further object is to provide a simple and efficient means for intermittently advancing the film.

A further object is to provide a novel film advancing means adapted to be used with the usual portable projector films.

Other objects and advantages will appear as the description proceeds.

Referring to the drawing:

Fig. 1 is a sectional view of a motion picture projector embodying my invention, taken on line 1—1 of Fig. 3, Fig. 2 is a fragmentary front elevation of the device shown in Fig. 1, Fig. 3 is a sectional rear view of the apparatus taken on line 3—3 of Fig. 1, Fig. 4 is a detail view of the means for advancing the film, and, Fig. 5 is a similar view of the apparatus shown in Fig. 4, showing the apparatus in condition for re-winding the supply reel.

The apparatus is mounted on a base 9 to which are secured frame members 11 and 12. Frame member 11 has a rearwardly extending arm 13 at its upper end in which a shaft 14 is rotatably mounted. This shaft carries a film supply reel 15 and in order to facilitate the removal and replacement of a reel and insure true mounting of the reel, the reel is provided with a square aperture at one side and a round aperture at the other side. Mounted upon the shaft is a U-shaped spring 16 which is secured to the end of the shaft by a round headed nut 17. The square aperture of the reel fits over the spring and the round aperture fits over the round headed nut, and abuts against the spring to limit its movement. The leaves of the spring press outwardly and frictionally engage opposite sides of the square aperture and thus cause the shaft and reel to rotate in unison, and prevent the reel from slipping off the shaft. The opposite end of the shaft extends through arm 13 and has a knurled grip for rotating the reel in re-winding a film on the supply reel. A film 19 having the usual perforations 21 along either side thereof passes from the supply reel, over a guide retained between frame plates 11 and 12. This guide comprises plates 22 and 23. Plate 22 consists of a flat portion 24 having a light aperture 25 therein and curved portions 26 and 27. Extending upwardly from the curved portion 27 is a transverse bead 28 forming a transverse depression 29 between curved portion 27 and bead 28. The guide plate 23 comprises a flat portion 31 having a light aperture 32 coinciding with the light aperture 25 in plate 22. The lower end of plate 23 is bent forwardly and has a hook 33 at its lower end surrounding a pin 34 mounted in the frame members. In order to resiliently urge the flat surfaces of the guide plates together and frictionally hold the film therebetween, a pivotally mounted bolt 35 extends through the plate 23 and a spring 36 resiliently engages the plate. The tension of this spring may be adjusted by means of a nut 37. The upper end of plate 23 is bent forwardly as at 38 and has a rearwardly extending portion 39 which forces the film into the transverse depression 29. This upper portion of plate 23 bridges or spans the film between flat portion 31 and rearwardly extending portion 39. The film is advanced between the guide plates by means of a bell crank lever 41 pivotally mounted upon a pin 42. The forward end 43 of the bell crank lever is tapered and at the base of the tapered portion is a notch 44.

Upon the upward movement of arm 41 the rounded surface 43 rides over the film and forces the tensioned portion of the film under the span of plate 23 forwardly. However, upon the downward movement of the arm, notch 44 engages one of the perforations at the side of the film and advances the film downwardly. Bell crank lever 41 is reciprocated or oscillated by means of a cam 45 which engages a roller 46 mounted on one arm of the lever. This roller is held in engagement with the cam by means of a helical spring 47 mounted on pin 42. One end of this spring is secured to the frame at 48 and the other end engages the upper arm of the bell crank lever and forces it upwardly. Cam 45 is mounted upon a shaft 49 which is journaled in frames 11 and 12 and has the shape of a crank 51 between the frames. A pair of collars 52 may be mounted upon the shaft to prevent longitudinal movement thereof. Shaft 49 also carries a driven pulley 53 and a fly wheel 54.

On the crank 51 of shaft 49 is a shutter 55 which is so adjusted with respect to cam 45 as to be in alignment with apertures 25 and 32 during the major portion of the movement of the film. The driving means for the apparatus consists of a shaft 56 carried by rearwardly extending arms 57 of the frame. This shaft is provided with a crank 58 having a handle or grip 59 by means of which the shaft may be manually rotated. In order to prevent longitudinal movement of the shaft a pair of collars 61 is secured to the shaft on the outside of arms 57. Intermediate the arms 57 a take-up reel 60 is frictionally mounted upon the shaft. The friction between the shaft and take-up reel is just sufficient to produce a slight tension in the film and thus keep all of the film which has passed through the guide wound on the reel. This reel rotates intermittently and in order to prevent it pulling too hard on the film when it is suddenly stopped by the film, a spring 50 is provided to take up the impact and prevent the film being drawn through the guide.

A drive pulley 62 is secured to the end of the shaft and is adapted to rotate driven pulley 53 by means of a belt 63. Mounted upon the rear of the frame is a lamp housing 64 provided with a removable cover plate 65. Within the housing is a lamp 66 and the light from this lamp passes through a pair of condensing lenses 67 which converge the rays of light and direct them through the film through apertures 25 and 32 in the guide plates. After passing through the film the light is passed through a second set of lenses 68 and on to a screen. The lenses 67 are supported in the lamp housing by providing a pair of slits 69 in the sides of the housing in which the periphery of the lenses engage. The lenses 68 are secured in a cylinder 71 which is slidably mounted in arcuate arms 72 of the frame. The efficiency of the lighting system may be increased by providing a reflector 73 in the lamp housing.

The operation of the apparatus is as follows:

A supply reel carrying a film to be displayed is rotatably mounted on shaft 14 as described above, and the end of the film is threaded between guide plates 22 and 23. The threading of the film between the guide plates may be readily accomplished by moving plate 23 forwardly against the tension of spring 36. The plate is then released and the end of the film is pulled downwardly and secured to take-up reel 60. The apparatus is now ready to be operated and a rotation of the crank causes the rotation of shaft 49, actuating lever 41 to advance the film. During the movement of the film, shutter 55 passes in front of apertures 25 and 32 to interrupt the beam of light. This shutter again passes through the beam of light as it moves upwardly. However, on account of the speed of the shutter together with the short duration of the time during which the light is shut off, it will not produce a flicker on the screen. After the film has been exhibited, plate 23 is held outwardly and the film may be rewound upon the supply reel by rotating the knurled projection 18 of the supply reel shaft.

It will be understood that the nature and embodiments of the invention herein described and disclosed, is merely illustrative, and that many modifications may be made therein without departing from the spirit and scope of the invention.

What I claim is new and desire to protect by Letters Patent of the United States is:

1. In a moving picture projector, a guide plate for a perforated film, a second guide plate having a flat vertical portion and an upper and a lower portion offset away from the first plate, a substantially right angular flange on the top offset portion for engaging the film, pivot means at the end of the lower offset portion and resilient means bearing against said lower offset portion for resiliently holding the second mentioned plate against the first mentioned plate, a reciprocable arm positioned to engage the perforations of said film to intermittently advance the film, and means for actuating the arm.

2. In a moving picture projector, two frame plates, a bearing on each of said plates, a shaft journaled in each of the bearings and projecting beyond one bearing, said shaft provided with a U-shaped crank between the plates, a single-piece imperforate shutter secured to the crank and adapted to be moved in a circular path when the shaft is rotated, and means for rotating the shaft.

3. In a projector as defined in claim 2, a second shaft journaled between the plates, a bell crank lever secured to said shaft, a cam carried by the first shaft and engaging one arm of the bell crank, a second arm of the bell crank shaped to engage the usual perforations of a film, and spring means on the second shaft for returning the bell crank when it has been moved by the cam.

4. In a moving picture projector, a guide for a film, means for intermittently advancing the film, a U-shaped crank shaft, a cam for actuating said means and mounted on the shaft, a shutter for interrupting a beam of light during the movement of the film mounted between the legs of the U, a manually rotatable shaft for actuating the first mentioned shaft, and a take-up reel frictionally mounted on said manually rotatable shaft.

5. A moving picture projector comprising a frame, guide plates for a perforated film, a reciprocating member carried in the frame in the form of a bell crank lever having one arm with a tooth on the end thereof for engaging in the perforations of said film to intermittently advance the film in one direction, a rotatable shaft journalled in the frame, a longitudinal extension on said reciprocating member extending through the frame, a cam mounted outside the frame on said rotatable shaft having a surface for engaging said longitudinal extension for causing a rapid movement of said arm in one direction for advancing the film between the guide plates, a source of light for projecting a beam of light through a portion of said film, and means carried by said shaft within the frame for interrupting said beam of light during movement of said film.

6. In a moving picture projector, a guide plate for a perforated film having a flat portion for guiding the film in a straight path and a transversely inwardly depressed portion near the top of said plate, a second guide plate having a flat portion adjacent the flat portion of the first guide plate and an inwardly projecting portion at the top of the second plate for pressing the film into the transversely depressed portion of the first guide plate during the projection of pictures on the film, said inwardly projecting portion forming a span below the transversely depressed portion and leaving a space between the guide plates, a reciprocable arm positioned to engage the perforations of said film at said space between the guide plates to intermittently advance the film, and means for actuating the arm.

7. In a moving picture projector, a frame, a guide for a film, means for intermittently advancing the film through the guide with said means having a longitudinal extension outside the frame, a rotatable shaft journalled in said frame, a cam mounted on the shaft outside the frame and engaging said longitudinal extension for actuating said means, a shutter for interrupting a beam of light during the movement of the film mounted on the same shaft and within the frame, a manually rotatable shaft with connecting means for actuating the first mentioned shaft, and a take-up reel mounted on said manually rotatable shaft and rotated to take up the film moved through said guide.

8. In a moving picture projector, a pair of frame members, a supply-reel and a take-up reel, a first guide plate clamped between said members, a second guide plate pivotally mounted on the frame at the lower end of said first plate, with resilient means secured to the frame and bearing against said second guide plate to resiliently urge the second plate toward the first plate for guiding the film from the supply reel to the take-up reel, and to permit pivotal withdrawal of said second plate for rewinding of the film, a crank shaft mounted in said frame members with the crank portion between the frame members, a single imperforate member mounted centrally of the crank portion and functioning as a shutter, a cam mounted on the shaft portion of the crank shaft outside of the frame members, and a bell crank lever for intermittently advancing the film mounted between the frame members and actuated by said cam.

9. In a moving picture projector, a frame, a pair of guide plates for a perforated film, with one of said guide plates secured in the frame, and the second of said guide plates pivotally mounted in the frame and resiliently urged toward the first of said guide plates, means for intermittently advancing the film, a rotatable shaft, a cam for actuating said means and mounted on said shaft, a shutter mounted directly on the same shaft for interrupting a beam of light during the movement of the film, a manually rotatable shaft with connecting means for actuating the first mentioned shaft, a take-up reel frictionally mounted on said manually rotatable shaft, and a downwardly extending spring member secured to the lower portion of said first guide plate and bearing against the film on that portion of the film between the guide plate and take-up reel for equalizing the tension of the take-up reel to assist in providing a smooth movement of the film through the projector.

10. In a moving picture projector, a frame, picture projecting means carried by the frame including a source of light and lenses, a pair of guide plates supported by the frame for carrying a film therebetween, said guide plates having corresponding apertures through which the light is projected, means for feeding the film through the plates, said means including a shaft carried in the frame, a single reciprocating arm pivoted on the shaft having means at one end for engaging in the perforations in the film, a second shaft supported in the frame, a cam carried on the shaft adapted to engage the other end of the reciprocating arm to move the same upon rotation of the cam, and a single imperforate shutter carried by the second shaft and movable therewith whereby upon movement of said second shaft the film is moved between the plates and the light source intermittently interrupted by the movement of the shutter.

CARL JACOB CRAIG.